United States Patent [19]

Gosser

[11] Patent Number: 4,681,751

[45] Date of Patent: Jul. 21, 1987

[54] CATALYTIC PROCESS FOR MAKING $H_2O_2$ FROM HYDROGEN AND OXYGEN

[75] Inventor: Lawrence W. Gosser, Wilmington, Del.

[73] Assignee: E. I. Du Pont de Nemours and Company, Wilmington, Del.

[21] Appl. No.: 726,695

[22] Filed: Apr. 22, 1985

Related U.S. Application Data

[63] Continuation-in-part of Ser. No. 506,893, Jun. 22, 1983, abandoned.

[51] Int. Cl.$^4$ .............................................. C01B 15/02
[52] U.S. Cl. ..................................................... 423/584
[58] Field of Search ......................................... 423/584

[56] References Cited

U.S. PATENT DOCUMENTS

| 3,336,112 | 8/1967 | Hooper | 23/207 |
|---|---|---|---|
| 3,361,533 | 1/1968 | Hooper | 23/207 |
| 4,007,256 | 2/1977 | Kim et al. | 423/584 |
| 4,009,252 | 2/1977 | Izumi et al. | 423/584 |
| 4,279,883 | 7/1981 | Izumi et al. | 423/584 |
| 4,335,092 | 6/1982 | Dalton, Jr. et al. | 423/84 |
| 4,336,238 | 6/1982 | Dalton, Jr. et al. | 423/584 |
| 4,336,239 | 6/1982 | Dalton, Jr. et al. | 423/584 |
| 4,379,778 | 4/1983 | Dalton, Jr. et al. | 423/584 |
| 4,389,390 | 6/1983 | Dalton et al. | 423/584 |

OTHER PUBLICATIONS

Swern, *Organic Peroxides*, Wiley-Interscience, New York, p. 26, (1970).
Schumb et al., *Hydrogen Peroxide*, Reinhold Publishing Corporation, p. 179 (1955).
Halle, *Chemical Engineering News*, 62(47):4 (1984).
Schwoegler, *Chemical Engineering News*, 63(1):6 (1985).
Russian Journal of Physical Chemistry, 35(2):143–148 (1961), Pospelova et al.

*Primary Examiner*—John Doll
*Assistant Examiner*—Wayne A. Langel
*Attorney, Agent, or Firm*—James A. Costello

[57] ABSTRACT

A process for making hydrogen peroxide from hydrogen and oxygen at superatmospheric pressures employing, as catalyst, Pd on adsorbent carbon, the reaction being run in an aqueous medium comprising substantially no organic component.

17 Claims, No Drawings

CATALYTIC PROCESS FOR MAKING $H_2O_2$ FROM HYDROGEN AND OXYGEN

CROSS-REFERENCE TO RELATED APPLICATION

This application is a continuation-in-part of copending application Ser. No. 506,893 filed on June 22, 1983, abandoned.

BACKGROUND OF THE INVENTION

This invention concerns an improved catalytic process for producing hydrogen peroxide from hydrogen and oxygen. The process improvements described herein permit production of hydrogen peroxide in concentrations greater than heretofore possible. Furthermore, the generally higher than expected concentrations are achieved in a substantially all-aqueous reaction medium. Thus, process safety is assured and a major impediment to a high-yield, safe process for making hydrogen peroxide is removed.

In regard to the danger inherent in producing hydrogen peroxide in the presence of an organic component, reference is made to the following publications: Swern, "Organic Peroxides", Wiley Interscience, New York, 1970, page 26 (extreme caution); Schumb et al., "Hydrogen Peroxide", Reinhold Publishing Corporation, 1955, page 179 (explosive characteristics); Halle, Chemical and Engineering News, page 4, Nov. 19, 1984 (potential hazard of . . . organic peroxide); Schwoegler, Chemical and Engineering News, page 6, Jan. 7, 1985 (shock sensitivity of acetone peroxides).

There are several publications which appear to ignore the note of caution counseled by the foregoing commentators, including: U.S. Pat. Nos. 4,389,390; 4,379,778; 4,336,238; and 4,336,239. Since explosion hazards are greater at increased concentrations of hydrogen peroxide-in-organic, the relatively low concentrations of hydrogen peroxide heretofore produced by the art may represent an attempt to lessen the risk of explosion.

Processes that do not employ the dangerous expedient of producing mixtures of hydrogen peroxide and an organic component have other features that distinguish them from the process of this invention. For instance, U.S. Pat. No. 4,009,252 discloses a process employing hydrogen pretreatment of a Pd-on-silica catalyst. U.S. Pat. No. 4,279,883 discloses Pd catalysts on various supports all described as equivalent for support purposes.

SUMMARY OF THE INVENTION

This invention concerns an improved catalytic method for making hydrogen peroxide from hydrogen and oxygen in a reaction medium at superatmospheric pressures, wherein the improvement comprises:
(i) employing an aqueous reaction medium having substantially no organic component present, e.g., none in excess of about 2% by weight of the reaction medium, and
(ii) employing a catalytically effective amount of Pd on adsorbent carbon.

By "adsorbent" carbon is meant carbon which adsorbs at least 0.1 mg of palladium per 10 mg of powdered carbon when the carbon is contacted at room temperature for five minutes with a solution prepared from 1 mg of $PdCl_2$ per gram of 0.1N HCl at a ratio of carbon to palladium solution of 6 mg/g. It is preferred that the weight ratio of Pd to Pd plus carbon be above about 0.1 percent, most preferably above about 0.5 percent.

It is characteristic of the improved process of this invention that the Pd/C catalyst is relatively resistant to loss of Pd from the C in solutions comprising HCl and hydrogen peroxide. This characteristic is believed to affect the levels of hydrogen peroxide that are obtainable by this process. In that regard, concentrations of the $H_2O_2$ in excess of 13% by weight are regularly achievable. Good catalyst lifetime is characteristic of the process of this invention.

This invention also concerns an improved method for making hydrogen peroxide as described employing not a preformed Pd/C catalyst but one that is made in situ. In this embodiment, an aqueous reaction medium is employed in step (i) which has substantially no organic component present. Process step (ii) wherein the catalyst is made in situ comprises employing a catalytically effective amount of Pd on adsorbent carbon catalyst, said catalyst prepared by adding a Pd salt, a halide-containing solution and finely divided adsorbent carbon to the reaction vessel or to a vessel interconnected with said reaction vessel.

The ratio of Pd to Pd plus carbon can vary from about 0.1 up to 10 percent, the upper and lower limits being practical ones. Preferred results are achieved at about 2% Pd to Pd plus carbon. The concentration of Pd/C catalyst in the reaction mixture will be, preferably, 0.05 to 1 percent by weight for best results. Catalyst particles that pass a 325 mesh (44 $\mu$m) screen are preferred. Best results are obtained with particles that are smaller than about 5 microns in size.

Typically, the process has been run at relative ambient partial pressures of $O_2$ to $H_2$ of about 2 to 1 up to 20 to 1 or higher. Ratios of 20 to 1 and above are preferred to avoid the danger of explosion during continuous process runs. Although ratios of less than 2 to 1 can be employed, such ratios may result in lower $H_2O_2$ concentrations.

The process of this invention can be run with premade catalyst or with catalyst made in situ. Regardless whether the catalyst is premade or made in situ in the reaction mixture, the latter will comprise both an acid component and a halide ion component for best results. The preferred halides are $Cl^-$, $Br^-$ or a combination of $Cl^-$ and $Br^-$. Most preferably, the halide is $Br^-$. The improvement represented by the bromide method is that correspondingly less halide can be employed to produce equivalent product yields. In certain instances, the improvement achieved with bromide vs. chloride is several orders of magnitude.

Typically, total halide ion concentrations will be about $1\times10^{-5}$ to 2M. It is preferred to employ bromide ion concentrations between about $5\times10^{-5}$ to 0.2M. Chloride ion concentration will usually range between about $1\times10^{-4}$ to 2M. The acid component helps improve $H_2O_2$ concentrations at low halide levels. Acceptable acids include hydrochloric, phosphoric, sulfuric and perchloric. Other strong protonic acids can be employed provided they are compatible with the reaction ingredients. The hydrogen ion concentration will be about $10^{-6}$ to 10M. The concentrations of acid and halide ion are interrelated so that best results are achieved with relatively high acid concentrations when the halide concentrations are at the low end of the recited ranges.

DETAILS OF THE INVENTION

The carbon support can be derived from many sources providing that it exhibits the above described palladium-adsorption characteristics. Representative adsorbent carbons include Alfa USP activated charcoal, Strem activated carbon, Supelco Carbosieve B and West States carbon cc-521 G. Some commercially available carbons which are not adsorbent can be converted to adsorbent carbons by methods (described hereafter) designed for that purpose. Typical of carbons which are nonadsorbent as purchased are MCB wood charcoal, Carbopak C, Graphite-38 and Fisher reagent charcoal.

Operable carbons have been obtained from a number of sources including coconut husks, petroleum, coal and vinylidene chloride polymer. Suitable carbons can also be prepared by heating sugars and cellulose in $N_2$ by stages to 900° to 1100° C. and then post-treating to generate activity. The most preferred post-treatment includes high temperature treatment in an atmosphere containing water vapor. Other activation procedures such as high temperature (about 1000° C.) treatment in $CO_2$ or $H_2$ can also be employed. Suitable material was also formed by mild oxidation (450° in air) of pyrolyzed cellulose. Material formed in this way can be improved by subsequent heating to about 950° C. in $N_2$. In many instances the adsorbency of initially poorly adsorbent carbons can be enhanced substantially by such activation procedures.

An advantage of the use of a substantially all-aqueous medium is that explosion hazards associated with the combination of high hydrogen peroxide concentrations and organic cosolvents are absent. Another advantage is that a large organic recycle stream is avoided. Other advantages include the lessening of explosive hazards caused by buildup of organic peroxy compounds and elimination of catalyst deactivation caused by decomposition of organic materials.

The process can be carried out at 0° C. to 50° C. and preferably from about 0° C. to 25° C. Lower temperatures can be employed so long as liquid freezing is not a problem. Depending on the type and concentration of reaction ingredients, temperatures below −10° C. are contemplated. Presence of about 15% $H_2O_2$ in the reaction mass will permit operation at −10° C. without freezing.

Preferred pressures for hydrogen peroxide formation are about 500 psig (2.86 MPa) to 2500 psig (17.34 MPa). A pressure range of about 200 psig to 4000 psig can be used with increasing hydrogen peroxide concentrations resulting from use of higher pressures. In semibatch operation, with gases continuously entering and exiting the reactor, peroxide concentrations above about 15% can be achieved at about 400 psig. an inlet $O_2/H_2$ ratio of about 1:1, and exit gas $O_2/H_2$ ratios of up to about 6 or 7 at the end of the run.

Continuous operation of the process of this invention is contemplated at about 1000 psig, about 50 psig $H_2$ partial pressure, about 950 psig $O_2$ partial pressure, about 1 mg of 5% Pd/C per gram of reaction mixture, about 0.5M $H_3PO_4$, and about −10° C. to 25° C., with vigorous gas-liquid contact.

The following Examples illustrate the direct formation of hydrogen peroxide from hydrogen and oxygen. The "Procedure" represents the standard test employed to determine carbon adsorbency. With regard to exemplification of this invention, it is noted that experimental results not included herein support the conclusion that the described process very often produces concentrations of $H_2O_2$ in excess of 13%. The carbon employed in these Examples was adsorbent or, in the case of Example 7, was believed to be adsorbent.

EXAMPLE 1

A reaction mixture was prepared from 5.0 mg of commercial (Alfa) 5% Pd/C and 1.00 g of aqueous 0.1N HCl. This was placed in a small heavy walled glass flask containing a Teflon ® covered magnetic stirring bar and sparged with $N_2$. The flask was closed with a metal flange and Teflon ® gasket so that a flow of gas could be maintained under pressure. The outside of the flask was cooled with a stream of cold air and the outside wall temperature was monitored with a thermocouple. The flask and gas supply equipment were put into a heavy metal barricade. The apparatus was evacuated to about 2 psi (0.02 MPa), and then filled to 450 psig (3.20 MPa) with argon for a 15 min pressure test. The pressure was reduced again to about 2 psi (0.02 MPa) and then $H_2$ was admitted to 100 psig (0.79 MPa) for 5 min (all at room temperature). The pressure was again reduced to about 2 psi (0.02 MPa) and mixed gas was admitted to a pressure of 394 psig (2.80 MPa) and maintained between that pressure and 380 psig (2.73 MPa) during the experiment.

The reaction mixture was stirred for 4.5 hr while gas was allowed to flow slowly from the flask and be replaced by gas from the supply reservoir. The temperature varied between 9° and 11°. The gas supply reservoir and the exit from the reaction flask were both connected to a gas chromatograph analytical system. The mixed gas was He 5.44, $H_2$ 44.2, $O_2$ 50.4 mol %. The gas flowing from the flask showed decreasing $H_2$ concentration and increasing $O_2$ during the run (He, 11.4; $H_2$, 23.9; $O_2$, 64.8 in last analysis). The weight gain by the reaction mixture during the run was 0.96 g. The $H_2O_2$ content was determined by titration with potassium permanganate solution to be 15.1 weight percent.

EXAMPLE 2

The apparatus was the same as that described in Example 1. The reaction mixture was prepared by mixing 3 mg of commercial (Alfa) 5% Pd/C catalyst with 1.00 ml of 0.1N HCl (aqueous). The leak check was done with 450 psig (3.20 MPa) of $O_2$. No hydrogen pressure step was employed. The reaction period was 3.9 hr with the temperature between 1° and 5°. The pressure varied between 540 psig (3.82 MPa) and 370 psig (2.65 MPa) during the run. The mixed gas composition was He, 4.8; $H_2$, 41.7; $O_2$, 53.6 mol %. Near the end of the run the exit gas from the flask contained He, 11.1; $H_2$, 14.4; $O_2$, 74.5%. The weight gain during the run was 0.88 g. The $H_2O_2$ content was 18.1 weight percent.

EXAMPLE 3

The apparatus for this experiment was a 400 ml autoclave containing a glass liner. The autoclave was mounted on a shaking table in a large metal barricade with facilities for adding and removing gases and monitoring temperature from outside of the barricade. The reaction mixture consisted of a mixture prepared from 10 mg of commercial adsorbent carbon powder (Strem), 10.0 g of 0.1N aqueous HCl and 1.7 mg of $PdCl_2$. The charged autoclave was evacuated to about 2 psi (0.02 MPa) and then 250 psig (1.83 MPa) of $H_2$ was added. After 15 minutes, $O_2$ was added to bring the pressure up to 750 psig (5.27 MPa). After 4 hours agitation with the autoclave body temperature at 10°, the weight gain was 2.60 g and the hydrogen peroxide content in the reaction mixture was found to be 8.9 weight percent by titration with potassium permanganate solution.

EXAMPLE 4

The apparatus used was the 400 ml shaken autoclave described in Example 3. The reaction mixture was prepared from 10 mg of adsorbent carbon (Strem) which had passed through a 400 mesh sieve (37 μm), 0.85 mg of $PdCl_2$, and 10.0 g of 0.1N aqueous HCl. Oxygen was added to the vessel to 1000 psig (7.00 MPa) and after 10 minutes hydrogen was added to bring the pressure to 1500 psig (10.44 MPa). Agitation was continued for 4 hr with the autoclave body at 12° to 14°. The weight gain was 2.74 g and permanganate titration showed the $H_2O_2$ content of the recovered mixture to be 10.7 weight percent.

EXAMPLE 5

The apparatus used was the 400 ml shaken autoclave described in Example 3. The reaction mixture was prepared from 10 mg of adsorbent carbon (Strem) which had passed through a sieve with 5 micron openings. This mixture was added to 10.0 g of an aqueous solution of 0.85 mg of $PdCl_2$ dissolved in 0.1N aqueous HCl. Oxygen was added to 1000 psig (7.00 MPa) and after 10 minutes hydrogen was added to 1500 psig (10.44 MPa). Agitation was continued for 4 hr with the temperature 11° to 13°. The weight gain was 5.48 g and the permanganate titration showed that 18.7 weight percent of hydrogen peroxide had been formed.

EXAMPLE 6

The apparatus used was the 400 ml shaken autoclave described in Example 3. The reaction mixture was prepared from 20 mg of commercial (Alfa) 5% Pd/C catalyst which had been passed through a 325 mesh (44 μm) sieve and 10.0 g of 0.1N aqueous HCl. Hydrogen was added to 300 psig (2.17 MPa) and then oxygen was added to 2500 psig (17.34 MPa). Agitation was continued for 3.3 hr with the autoclave body at 12° to 14°. The weight increase was 5.16 g and the $H_2O_2$ content of the recovered reaction mixture was 22.8 weight percent.

EXAMPLE 7

The apparatus used was the 400 ml shaken autoclave described in Example 3. The reaction mixture was prepared from 15 mg of powdered Alfa 10% Pd/C catalyst and 10.0 ml of 0.1N aqueous HCl. Oxygen was added to the vessel to 1000 psig (7.00 MPa) and, after 15 minutes, hydrogen was added to 1500 psig (10.44 MPa). The mixture was shaken for 4 hr with the autoclave body at about 10° C. The weight gain was 6.38 g and the $H_2O_2$ content of the recovered reaction mixture was 25.2 weight percent.

EXAMPLE 8

The apparatus used was the 400 ml shaken autoclave described in Example 3. The reaction mixture was prepared from 0.50 g of solution containing 1.7 mg of $PdCl_2$/g of solution, 1.0 g of a solution containing 1 mg Tamol ® dispersing agent (Rohm & Haas SN 6-0224) per g distilled water, 4.0 g of distilled water, 4.5 g of 0.2N aqueous HCl and 10 mg of Strem carbon (passed through a sieve with 5 micron openings). Oxygen was added to the vessel to 1000 psig (7.00 MPa) and after 10 minutes hydrogen was added to 1500 psig (10.44 MPa). The mixture was shaken for 4 hr with the autoclave body at 10° to 12° C. The weight gain was 5.33 g and the $H_2O_2$ content of the recovered reaction mixture was 22.9 weight percent.

EXAMPLE 9

The apparatus used was the 400 ml shaken autoclave described in Example 3. A palladium bromide solution was prepared in the following steps. Alfa $PdBr_2$ (125 mg) was added to 1.1 g of a solution prepared by dissolving 2.0 g of NaBr in 20 ml of distilled water and the mixture was warmed. After cooling to room temperature, water was added to bring the total weight to 5 g. A 1.0 g portion of this solution was diluted with 1.0 g of 0.5M $H_3PO_4$ and 8.0 g of distilled water.

The reaction mixture was prepared from 10 mg of commercial (Alfa) charcoal which had passed through a 325 mesh sieve, 8.5 g of distilled water, 0.50 g of 2M $H_3PO_4$ and 1.0 g of the $PdBr_2/NaBr/H_3PO_4$ solution. Hydrogen was added to 350 psig (2.5 MPa) and then oxygen was added to 2000 psig (13.9 MPa). Agitation was continued for 3.3 hours with the autoclave body at 15° to 18° C. The weight increase was 5.48 g and the $H_2O_2$ content of the recovered reaction mixture was 21.2 weight percent.

EXAMPLE 10

The apparatus used was the 400 ml shaken autoclave described in Example 3. A sodium bromide solution was prepared by dissolving 2.06 g of NaBr in 20 ml of distilled water and then diluting 2.0 g of this solution with 18.0 g of distilled water. The reaction mixture was prepared from 20 mg of Alfa 5% Pd/C sieved through 325 mesh, 1.0 g of the NaBr solution, 1.0 g of 0.5M $H_3PO_4$ and 8.0 g of distilled water. Hydrogen was added to 350 psig (2.5 MPa) and then oxygen was added to 2000 psig (13.9 MPa). Agitation was continued for 3.5 hr with the autoclave body at 9° to 13° C. The weight increase was 5.36 g and the $H_2O_2$ content of the recovered reaction mixture was 20.9 weight percent.

EXAMPLE 11

A glass reactor was charged with a mixture of 5 mg of 5% Pd/C (which had passed through a 400 mesh sieve) and 1.0 g of 0.5 mol/L HCl. During the reaction period, a mixture of 7% He in $H_2$ was fed at 3 ml/min and $O_2$ was fed at 11 ml/min (flows at ambient pressure and temperature). Gas was allowed to flow from the reactor to maintain the total pressure near 1000 psig. After 45 hours of agitation in a 3° C. water bath, the reaction mixture weighed 2.5 g and contained 23.8 weight percent of $H_2O_2$.

EXAMPLE 12

The reaction mixture and apparatus were as described in Example 11 with the same temperature and gas input flows. However, the pressure was kept at about 400 psig for 68 hours. The recovered reaction mixture weighed 2.2 g and contained 18.8 weight percent of $H_2O_2$.

EXAMPLE 13

The reaction mixture and apparatus were as described in Example 11 with the same temperature and gas input flows. The pressure was kept at about 200 psig for 68 hours. The recovered reaction mixture weighed 1.8 g and contained 11.1 weight percent of $H_2O_2$.

EXAMPLES 14 AND 15

The apparatus used was that described in Example 3. The reaction mixture was prepared from 10 mg of 5% Pd/C (which had passed through a 325 mesh sieve), 4.5 g of distilled water, 5 g of 0.0001 mol/L aqueous NaBr and 0.5 g of 2 mol/L aqueous $H_2SO_4$. Hydrogen was added to 300 psig, and oxygen was added to bring the pressure to 1512 psig. Agitation was continued for 3.3 hr with the autoclave body at 9° to 12° C. The weight increase was 3.9 g and the $H_2O_2$ content of the recovered reaction mixture was 19 weight percent. A similar run, but for 3 hr, with catalyst from a different sample of 5% Pd/C gave a 3.2 g weight and 14.8 weight percent of $H_2O_2$.

EXAMPLE 16

The apparatus used was that described in Example 3. The reaction mixture was prepared from 20 mg of 5% Pd/C (which had passed through a 400 mesh sieve), 18.0 g of distilled water, 1.0 g of 2 mol/L aqueous NaBr, and 1.0 g of 1.25 mol/L aqueous $H_2SO_4$. Hydrogen was added to 350 psig, and then oxygen was added to bring the pressure to 2000 psig. Agitation was continued for 3 hours with the autoclave body kept at 7° to 11° C. The weight increase was 4.4 g and the $H_2O_2$ content of the recovered reaction mixture was 13.4 weight percent.

EXAMPLE 17

An aqueous acid/halide solution was prepared by dissolving 0.103 g of NaBr and 4.90 g of $H_2SO_4$ in 1 liter of distilled water and then diluting this mixture to make 2 liters of solution. A reaction mixture was prepared from 150.0 mg of commercial (Alfa) 5% Pd/C and 35 ml of aqueous acid/halide solution. This mixture was placed in a 125 ml autoclave containing a glass liner. The reactor was sealed and placed in a heavy metal barricade. The reactor's gas phase was then replaced with argon at 500 psig (3.45 MPa). The outside of the reactor was cooled with a stream of cold water whose temperature along with the reactor wall and reaction mixture temperatures were monitored with thermocouples. After pressurizing, 25 ml of aqueous acid/halide was added to the reactor.

The reaction mixture was stirred with a spinning impeller at 750 rpm for 116 hr while gas was allowed to flow slowly from the reactor and be replaced by gas from supply reservoirs. The pressure was maintained between 490 psig (3.38 MPa) and 500 psig (3.45 MPa) during the experiment. Liquid from the reactor was removed continually and replaced by 0.3 cc/min aqueous acid/halide solution. Thus, a batch charge of 150 mg Pd/C was exposed to 2 L acid/halide solution. Established flows of oxygen and 3.0 mol percent of He in $H_2$ were 50 and 20 cc/min (at 25° C., 1.01 MPa), respectively. The gas flowing from the reactor was analyzed periodically by a gas chromatograph analytical system. The $H_2O_2$ content of the liquid was analyzed periodically by titration with potassium permanganate solution. Three distinct steady-states were achieved corresponding to reactor wall temperatures of 7.1°, 12.1° and 16.9° C. after about 10, 50 and 70 hrs, respectively. Representative analyses for the steady-states were He 1.23, $H_2$ 14.31, $O_2$ 84.44 mol percent with 4.35 weight percent of $H_2O_2$; He 1.26, $H_2$ 13.27, $O_2$ 85.46 mol percent with 4.59 weight percent of $H_2O_2$; and, He 1.33, $H_2$ 13.41, $O_2$ 85.24 mol percent with 5.03 weight percent of $H_2O_2$. Thus, this Example illustrates good continuous $H_2O_2$ production with one initial Pd/C charge.

Procedure

The following formula was employed to determine whether a particular carbon had the required degree of adsorbency:

No. of mg of Pd per 10 mg of carbon =

$$\left[1 - \frac{\text{adsorbence of carbon-treated solution}}{\text{adsorbence of untreated solution}}\right] \times \left[\frac{\text{mg of Pd}}{10 \text{ mg of carbon in starting solution}}\right]$$

The net optical densities of the supernatant $PdCl_2$-containing liquids were determined at 450 nm in a 1 cm cell using a Cary 14 spectrometer.

The embodiments of the invention in which an exclusive property or privilege is claimed are defined as follows:

1. An improved catalytic method for making hydrogen peroxide from hydrogen and oxygen in a reaction medium at superatmospheric pressures, wherein the improvement comprises:
   (i) employing an aqueous reaction medium having no organic component present in excess of about 2% by weight of the reaction medium,
   (ii) employing a catalytically effective amount of Pd on adsorbent carbon, and
   (iii) employing superatmospheric pressures in the range of about 200 psig to 4000 psig.

2. A method according to claim 1 that comprises preparing the Pd on carbon catalyst in situ.

3. A method according to claim 1 employing a weight ratio of Pd to Pd plus carbon above about 2 percent.

4. A method according to claim 2 employing a weight ratio of Pd to Pd plus carbon above about 2 percent.

5. A method according to claim 1 employing a total halide ion concentration between about $1 \times 10^{-5}$ to 2M and a hydrogen ion concentration between about $10^{-6}$ to 10M.

6. A method according to claim 5, wherein the superatmospheric pressures are about 500 psig to 2500 psig.

7. A method according to claim 6 wherein the halide comprises bromide.

8. A method according to claim 7 wherein the bromide ion concentration is $5 \times 10^{-5}$ to 0.2M.

9. A method according to claim 6 wherein the halide comprises chloride.

10. A method according to claim 9 wherein the chloride ion concentration is $10^{-4}$ to 2M.

11. An improved catalytic method for making hydrogen peroxide from hydrogen and oxygen in a reaction medium at superatmospheric pressures, wherein the improvement comprises:
    (i) employing an aqueous reaction medium having no organic component present in excess of about 2% by weight of the reaction medium,
    (ii) employing a catalytically effective amount of Pd on adsorbent carbon prepared by adding a Pd salt, a halide-containing solution and finely divided carbon to the $H_2O_2$ reaction vessel or to a vessel interconnected with said reaction vessel, and
    (iii) employing superatmospheric pressures in the range of about 200 psig to 4000 psig.

12. A method according to claim 11 employing a weight ratio of Pd to Pd plus carbon above about 2 percent.

13. A method according to claim 11 employing a total halide ion concentration between about $1 \times 10^{-5}$ to 2M and a hydrogen ion concentration between about $10^{-6}$ to 10M.

14. A method according to claim 13 wherein the halide comprises bromide.

15. A method according to claim 14 wherein the bromide ion concentration is $5 \times 10^{-5}$ to 0.2M.

16. A method according to claim 13 wherein the halide comprises chloride.

17. A method according to claim 16 wherein the chloride ion concentration is $10^{-4}$ to 2M.

* * * * *